US007516486B2

(12) United States Patent
Olivereau et al.

(10) Patent No.: US 7,516,486 B2
(45) Date of Patent: Apr. 7, 2009

(54) COMMUNICATION BETWEEN A PRIVATE NETWORK AND A ROAMING MOBILE TERMINAL

(75) Inventors: Alexis Olivereau, Orsay (FR); Miguel Catalina-Gallego, Tewksbury, MA (US); Christophe Janneteau, Bois d'Arcy (FR); Ismael Hery, Saint Aubin (FR)

(73) Assignee: Motorola, Inc., Schaumburg, IL (US)

( * ) Notice: Subject to any disclaimer, the term of this patent is extended or adjusted under 35 U.S.C. 154(b) by 660 days.

(21) Appl. No.: 10/550,109

(22) PCT Filed: Mar. 15, 2004

(86) PCT No.: PCT/EP2004/050310
§ 371 (c)(1),
(2), (4) Date: Sep. 19, 2005

(87) PCT Pub. No.: WO2004/086718

PCT Pub. Date: Oct. 7, 2004

(65) Prior Publication Data

US 2006/0185012 A1      Aug. 17, 2006

(30) Foreign Application Priority Data

Mar. 27, 2003    (EP) ................................. 03290770

(51) Int. Cl.
*G06F 21/20* (2006.01)
(52) U.S. Cl. ........................................ 726/13; 380/272
(58) Field of Classification Search ................... 726/13; 380/272
See application file for complete search history.

(56) References Cited

U.S. PATENT DOCUMENTS

| 6,823,386 B1 * | 11/2004 | Crump et al. ............... 709/227 |
| 7,246,373 B1 * | 7/2007 | Leung et al. ................... 726/15 |
| 2002/0069278 A1 | 6/2002 | Forsloew | |

FOREIGN PATENT DOCUMENTS

EP         0 909 072 A       4/1999

(Continued)

OTHER PUBLICATIONS

Narten T.: "(IPng 1348) Re: (mobile-ip) Re: draft-ietf-mobileip-ipv6-00.txt" IETF IPNG Mailing List, 'Online! Feb. 2, 1996. URL: http://www.cs-ipv6.lancs.ac.uk/ipv6/ma.

(Continued)

*Primary Examiner*—Christopher A Revak
*Assistant Examiner*—Brett Squires

(57) ABSTRACT

Communication between a private network (1) and a roaming mobile terminal (4), the private network (1) including a home agent (5) for the mobile terminal and a gateway (2, 3) through which, the communication passes and which-provides security protection for the private network (1). The protocols of the communication Including security association bundles each include a security association between the mobile terminal (4) and the gateway (2, 3) for inbound communication and another security association for outbound communication. In response to a handover of communication causing an IP address. (MN Co @) of the mobile terminal (4), to change to a new IP address (MN: New Co @), the mobile terminal updates its inbound security association from the, gateway (2, 3) so that it can receive packets sent to it with the new IP address (MN New Co @) as destination. It sends a first signalling message with: the home agent (5) as destination: in a secure tunnel (20') to the gateway (2, 3), indicating the new IP address (MN, New Co @) in secure form to the home agent (5). The inbound security association of the gateway (2, 3) from the mobile terminal (4) accets, the first signalling message without cheking its source address. The gateway (2, 3) forwards the first signalling message within the private network (1) to the home agent (5), the home agent (5) checks the validity of the first signalling message and, if It is valid, updates its address data and sends a second signalling message to the gateway (2,3) indicating the new address (MN New Co @). The gateway (2, 3) updates its outbound security association with the mobile terminal (4) in response to the new address (MN New Co @) indicated. Preferably, communication between the mobile node (4) and the gateway (2, 3) is in accordance with IPsec and an Encapsulating Security Paypépad protocol used in tunnel mode. Preferably, a registration reply for the mobile node (4) is included In the second signalling message.

8 Claims, 4 Drawing Sheets

FOREIGN PATENT DOCUMENTS

| | | |
|---|---|---|
| EP | 1 176 781 A | 1/2002 |
| EP | 1 204 247 A | 5/2002 |
| WO | WO 00/08818 A | 2/2000 |

OTHER PUBLICATIONS

Atkinson R.: "(IPng 1354) Re: (mobile-ip) Re: draft-ietf-mobileip-ipv6-00.txt" IETF IPNG Mailing List, 'Online! Feb. 5, 1996. URL: http://www.csipv6.lancs.ac.uk/ipv6/ma.

Teraoka Fumio: "(IPng 1341) Re: draft-ietf-mobileip-ipv6-00.txt" IETF IPNG Mailing List, 'Online! Feb. 2, 1996. URL: http://www.cs-ipv6.lancs.ac.uk/ipv6/ma.

Huitema C.: "(IPng 1355) Re: (mobile-ip) Re: draft-ietf-mobileip-ipv6-00.txt" IETF IPNG Mailing List, 'Online! Feb. 5, 1996. URL: http://ww.cs-ipv6.lancs.ac.uk/ipv6/ma.

Arkko J. et al.: Using IPsec to Protect Mobile IPv6 Signaling between Mobile Nodes and Home Agents, Internet, 'Online! Feb. 18, 2003. URL: http://www.potaroo.net/ietf/ids/draft-ietf-mobileip-mipv6-ha-ipsec-03.html>.

* cited by examiner

COMMUNICATION BETWEEN A PRIVATE NETWORK AND A ROAMING MOBILE TERMINAL

FIELD OF THE INVENTION

This invention relates to communication between a private network and a roaming mobile terminal.

BACKGROUND OF THE INVENTION

Many organisations utilise private networks, whose communications with terminals outside the private network pass through security gateways that protect the private network using techniques including firewalls.

Protection of private corporate information is of utmost importance when designing an information infrastructure. However, the separate private networking solutions are expensive and cannot be updated quickly to adapt to changes. In not by itself ensure privacy. Virtual private networking is the collection of technologies applied to a public network—in particular the Internet—to provide solutions for private networking needs. Virtual private networks use obfuscation through secure tunnels, rather than physical separation, to keep communications private.

Virtual private networks. ('VPN') accordingly enable private networks to be extended to enable securitised communication with roaming terminals, that is to say terminals situated outside the private network, the communication passing for example through the internet and possibly over mobile telephone networks. The Internet uses Internet Protocol ('IP') and the communications of mobile terminals often use Mobile internet Protocol ('MIP').

It is expected that the roaming usage of virtual private networks will become bigger and more frequent. Such frequently roaming users will need to be given the same level of security as fixed or occasional roaming terminals, through the corporate VPN/firewall architecture.

Different communication and security protocols are used for the different networks. An example of internet security protocol is the IPsec specification [S Kerit, R. Atkinson, "Security Architecture for the Internet Protocol", Internet Engineering Task Force (IETF), RFC 2401, November 1998]. Examples of mobile telephone communication protocols are the Mobile IPv4 specification [C. Perkins "IP Mobility Support", RFC 2002, October 1996] and the mobile IPv6 specification. When the VPN protocol is IPsec Encapsulating Security Payload and the mobility protocol is Mobile IP, both of them being implemented in the same IP layer, there is a need to specify how these two protocols must interact with each other when being simultaneously required.

Beyond basic application order (either apply Mobile IP first, or apply IPsec first), the overall solution must aim at meeting three major requirements:

Security. The fact that VPN Infrastructure can support Mobile-IP users must not create new security flaws to any corporate entity (corporate network & mobile or occasionally roaming users). Mobile IP enabled devices must provide mobile users with the same level of security as if they were physically located within the corporate network. On the other hand, Mobile IP entitles must be adequately protected by corporate security infrastructure (Firewalls) and Mobile IP specific security mechanism must not interfere with global security mechanism.

Compatibility. A solution that enables optimised Interaction between Mobile IP and IPsec must avoid heavily modifying protocol specifications. Future evolutions of Mobile IP & IPsec protocols must not be made excessively difficult due to the use of an optimised combined solution. Optimally, such evolutions should be transparent to the use of the combined solution.

Performance. The invention must address specific needs of mobile users in terms of handover quality, the handover must be made as quick as possible.

One example of a communication protocol for a virtual private network is the ESP (Encapsulating Security Payload) protocol (S, Kent, R. Atkinson, "IP Encapsulating Security Payload", Internet Engineering Task Force (IETF), RFC 2406, November 1998), used in tunnel mode. The most significant points are the following:

The whole incoming IP packet is tunnelled into a new one inner (original) source and destination addresses are not changed.

The whole incoming IP packet is encrypted and optionally (recommended) authenticated.

ESP tunnel mode is by definition a unidirectional peer-to-peer protocol. The sender (the one that encrypts and tunnels) and the receiver (the one that detunnels and decrypts) must share a cryptographic secret (e.g. key and algorithm used for encryption/decryption). The set of security parameters (protocol), key, algorithm, sender address, receiver address, lifetime, . . . ) constitutes a so-called IPsec Security Association ('SA'). IPsec requires two SAs (an SA bundle) to obtain a secured unidirectional communication: one on the sender and one on the receiver (with some common parameters, for example the key).

As a VPN communication is bidirectional (from Mobile Node ('MN') to VPN Gateway and from VPN Gateway to MN), two SA bundles are required; the first one describes the tunnel from MN to VPN Gateway, the second one describes the tunnel from VPN Gateway to MN. It must be "noted" that the designation "VPN Gateway" is not specified by the protocol: a VPN Gateway is simply the topologic entity that terminates, at the corporate network side, all VPN secure tunnels to/from roaming mobile nodes.

SA selectors are used for the, processing of IPsec packets. Basically, SA selectors are IP parameters that are used by IPsec layer to check that:

A packet that is about to be sent on a tunnel defined by a certain outbound SA is actually legitimate to be sent with that SA (e.g. source & destination addresses of the packet match with source and destination address of the SA). This test is called the "outbound SA selector check".

A packet that has been received from a tunnel defined by a certain inbound SA is actually legitimate to have been received with this SA (e.g. source & destination addresses of the packet match with source and destination address of the SA). This test is called the "inbound SA selector check".

It must be noted that, as illustrated in the two examples above, only source address & destination address will be considered in this invention as SA selectors for both inbound and outbound SAs.

Two families of proposals address this situation;

IPsec tunnel in the MIP tunnel.

With this family of proposals, the IPsec tunnel is established between the VPN Gateway and the Mobile Node Home Address.

External home agent. The home agent is placed in front of the IPsec gateway and the corporate firewall, i.e. outside the home network. Obviously, there are deep security flaws; the main one is that the home agent is no longer protected by the common protection (corporate firewall) mechanism at the border of the network, indeed, a home agent placed outside the gateway does not benefit from any protection and become an easy target. This kind of security flaw could not be accepted when designing a VPN solution aimed at securing communications.

Another problem stems from the tunneling mechanism that does not cipher the MIP packets (the IPsec tunnel is inside the MIP tunnel). The MIP header is in plain test and any attacker with bad intentions will have knowledge of all header fields, for instance the home address of the mobile node. Thus, this solution does not provide privacy and a malicious node might track all successive locations of a mobile node, identified through its home address.

MIP proxy. This proposal is described in a draft (F, Adrangi, P. Iyer, "Mobile IPv4 Traversal across VPN or NAT & VPN Gateway", IETF work in progress draft-adrangi-mobileip-natvpn-traversal-01.txt, February 2002). It assumes the creation of a new entity called a Mobile IP Proxy that appears as a surrogate home agent from a mobile node point of view and conversely is viewed as a mobile node by the home agent. This solution is also based on IPsec in MIP tunneling, which is less confidential in terms of privacy than MIP in IPsec as stated above.

The process of simple roaming requires new signaling messages between the MIP proxy, the VPN gateway, and the home agent: the MIP proxy acts as a relay between the mobile node and the home agent ('HA'); it must be aware of existing protection between the mobile node and the HA to forward valid request uniquely. It also interacts with the VPN gateway and a common packet from a corresponding node to a MN follows a heavy process, it is first MIP-encapsulated by the HA to the MIP proxy. Then the MIP proxy decapsulates it and gives it to the VPN gateway in order to realize encryption. The VPN gateway sends back the ciphered packets to the MIP proxy, which encapsulates it again in a new MIP packet.

The MIP proxy is located outside the protected domain in the Demilitarized Zone ('DMZ'), that is to say a small network inserted as a "neutral zone" between a company's private network and the outside public network. The security level of machines within the DMZ is far inferior to the corporate network. The firewalls must not interfere with the registration procedure between the proxy and the Home Agent. This architecture implies possible security flaws since the corporate firewall must let any packets between the MIP proxy and the Home Agent go through without further inspections; this can easily lead to compromise the entire corporate network if an attacker can manage to gain access to the MIP proxy.

MIP Tunnel in the IPsec Tunnel

With this family proposals, an IPsec tunnel is established between the VPN Gateway and the Mobile Node Care-of Address.

One proposal that includes the MIP tunnel in the IPsec tunnel has been described by the University of Bern, Switzerland at www.iam.unibe.ch/~rvs/publications/secmip_gi.pdf. The IPsec tunnel is reset before any new handover, when moving to a new network, it has to be re-established through the whole key distribution process. That handover mode creates unacceptable latencies of many seconds, incompatible with classical MIP requirements.

Another issue with this proposal consists in assuming that IPsec offers a sufficient protection and, as a consequence, in disabling authentication and replay protections during the MIP registration procedure. Disabling protections on the Home Agent is an option that does not really improve speed and requires home agents dedicated to MIP-VPN users, as well as other home agents dedicated to simple MIP users that still use MIP protections.

DETAILED DESCRIPTION OF THE PREFERRED EMBODIMENTS

Figure 1:
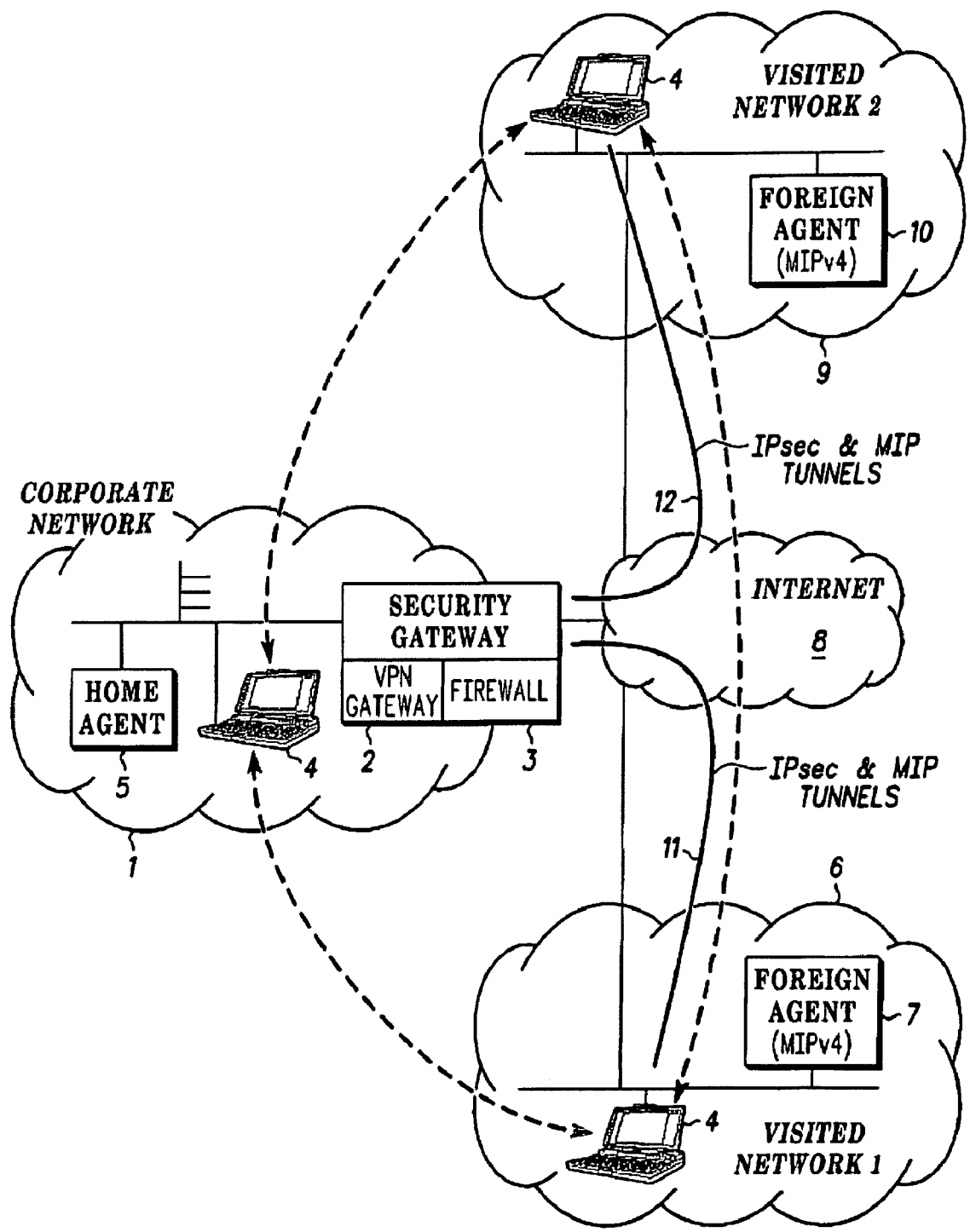
FIG. 1 is a schematic diagram of a mobile virtual private network scenario.

FIG. 1 shows a mobile virtual network scenario comprising a private network 1 including a security gateway comprising a VPN gateway 2 and a firewall 3, a mobile node 4 situated in the private network 1 and a home agent 5 for the mobile node 4. The embodiment of the present invention shown in the drawings is applicable especially where the mobile node 4 is capable of communication over a wireless link, which improves its ability to roam, both within and outside the private network 1 but this embodiment of the invention is also applicable where the mobile node 4 communicates only over wire connections.

FIG. 1 shows a scenario where the advantages of this embodiment of the invention are particularly appreciable, where the mobile node 4 moves outside the private network 1, first to a visited network 6 having a foreign agent 7 functioning under mobile IPV4 protocol, enabling communication of the roaming mobile node 4 in the network 6 through the internet 8 with the private network 1. In this scenario the roaming mobile node 4 then moves to a second visited network 9, having a foreign agent 10, also functioning under mobile IPV4 for communication through the internet 7 with private network 1. While this embodiment of the invention functions with Mobile IPv4 protocols, it will be appreciated that invention is also applicable to other protocols, especially the Mobile IPv6 protocol.

Figure 2:
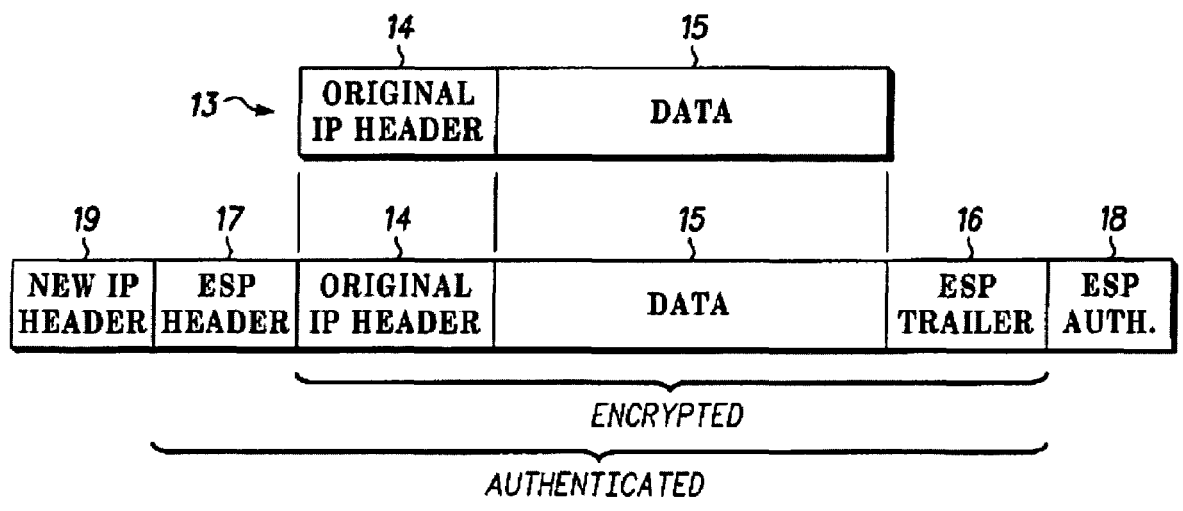
FIG. 2 is a diagram of a data packet encapsulated in ESP tunnel mode.

When the mobile node 4 is roaming in the visited networks 6 or 9, communications with the private network 1 are established through the internet 8 in IPsec and MIP tunnels 11 and 12 respectively. More specifically, the protocol used is the encapsulating security payload ("ESP") protocol illustrated in FIG. 2. According to this protocol, the original packet 13 comprises an original IP header 14 and data 15. The packet 13 is encrypted with an ESP trailer 16 without changing the original IP header and destination address. The encrypted packet is encapsulated with an ESP header 17 and preferably an ESP authentication 18 and assembled with a new IP header 19 before transmission. Security association bundles, each comprising an outbound and inbound communication security association, are established for communication over the paths 11 and 12 with the VPN gateway 2. Security association selectors check that packers to be sent using the tunnel defined by each outbound security association are legitimate to be sent with that security association and, in particular, that the source and destination addresses of the packet match with the source and destination addresses of the security association, this test being the outbound SA selector check. Packets received from a tunnel defined by the inbound security association are checked for legitimacy of reception with this security association and, in particular that the source and destination addresses of the packet match the source and destination addresses of the security association, this test being the inbound SA selector check.

In this embodiment of the invention the inbound security association of the VPN gateway 2 does not contain the IP address of the mobile node 4 as source address but a wild card ("*"). This allows the VPN gateway 2 to receive and forward a packet from the mobile node 4 whatever Care-of address it may use. It will be noted that this is not contradictory with IPsec protocol, since the wild card value is authorised by this protocol for the source address selector in a security association. The tunnel order is that of an MIP tunnel in the IPsec tunnel, with the IPsec tunnel between the VPN gateway 2 and the mobile node 4, using the mobile node Care-of address as end point.

Figure 3:
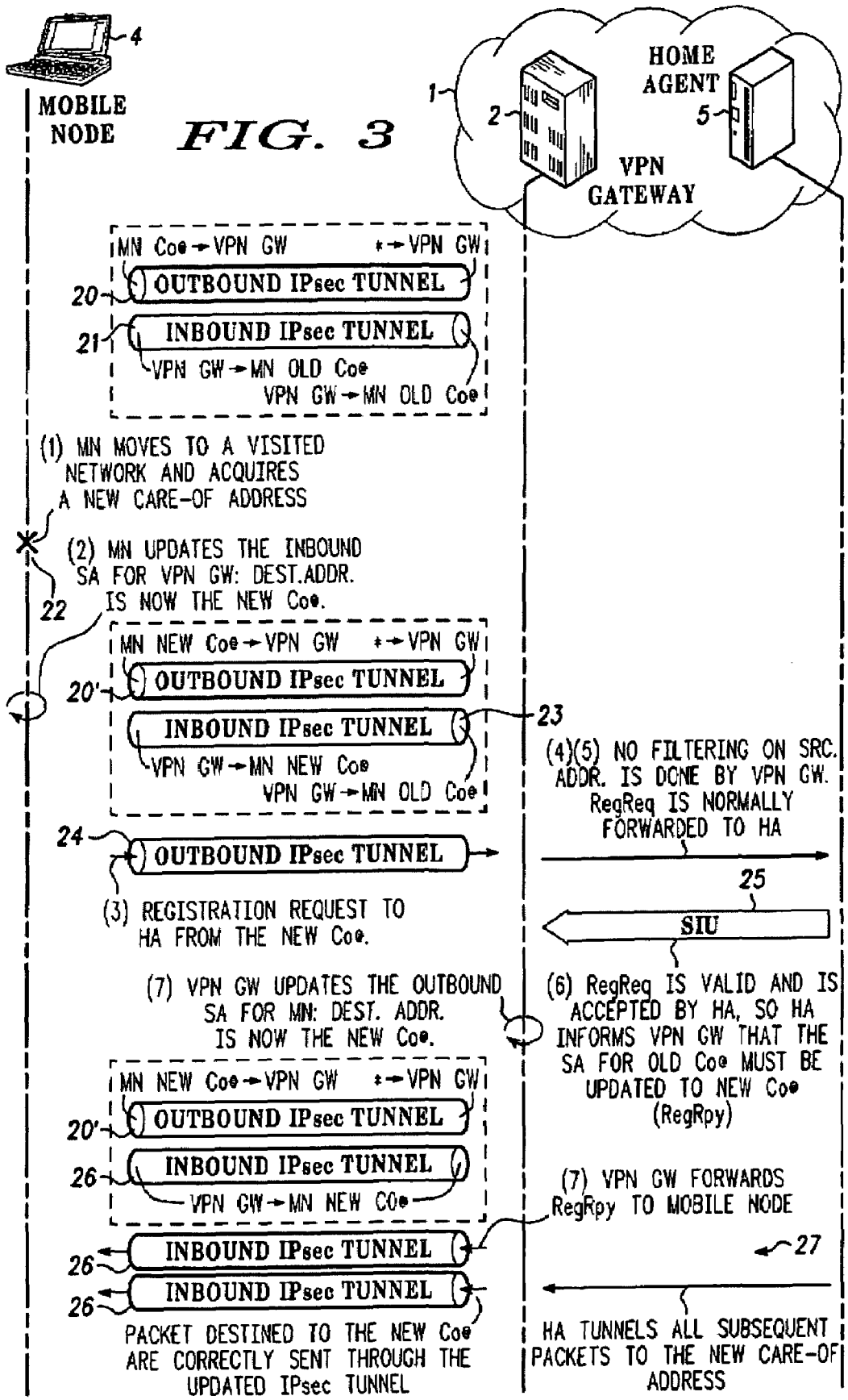
FIG. 3 is a flow chart of exchanges in communication between a private network and a roaming mobile terminal in accordance with one embodiment of the invention, given by way example.

The process for communications when the mobile node 4 is roaming is shown in FIG. 3, in which references to outbound and inbound refer to packets at the mobile 4. Initially, the IPsec tunnels are illustrated for the situation where communication is established at the current Care-of address of the mobile node 4. The outbound IPsec tunnel 20 has a security association at the mobile node 4, having the current mobile node Care-of address as source address and the address of the VPN gateway 2, having a wild card as the source address and the VPN gateway 2 address as the destination address. The initial inbound IPsec tunnel has a security association at the mobile node 4, with the address of the VPN gateway 2 as source address and the current Care-of address of the mobile node 4 as destination address, and a security association at the VPN gateway 2, having the VPN gateway address as source address and the mobile node 4 Care-of address as destination address.

When the mobile node moves at 22 from one visited network to another, for example, from the visited network 6 to the visited network 9, the mobile node 4 recognises that its location has changed, for example, from an incoming agent advertisement. It then configures a new Care-of address that is routable within the new visited network 9. The mobile node 4 contains VPN client software that responds to the change in mobile node location, for example, in response to network selection middleware or by monitoring the source addresses of outbound packets. The VPN client software then changes dynamically the inbound security association on the mobile node 4 so that its destination address is the new Care-of address of the mobile node, the inbound IPsec tunnel 21 becoming a temporary inbound IPsec tunnel 23. In this way the mobile node 4 will be able to receive packets securely sent by the VFN gateway 2 to its new Care-of address; otherwise the packets would be dropped as they would not match the destination address included in the former inbound IPsec tunnel 21. Similarly the VPN client software changes dynamically the outbound security association on the mobile node 4, 50 that its source address is the new Care-of address of the mobile node, the outbound IPsec tunnel 20 becoming an outbound IPsec tunnel 20'; otherwise the mobile node 4 would not be able to send outgoing packets as they would not match the source address included in the former outbound IPsec tunnel 20.

The mobile node 4 then sends a signaling message to its home agent to inform it of its new location, the signaling message passing through the outbound IPsec tunnel 20' and the VPN gateway 2. This signalling message is in the form of a registration request where the protocol used is mobile IPv4, as in this embodiment of the invention.

The signaling message is received at the VPN gateway 2 in step 24. The SA selector in the VPN gateway for the outbound tunnel 20' does not reject the packet since the source address is a wild card field and the source address is therefore not verified and the packet is forwarded to the home agent 5. At step 25 the home agent 5 receives and processed the registration request message from the mobile node 4 indicating the new Care-of address. If the registration request is valid the home agent 5 sends a security information update message ("SIU") to the VPN IPsec tunnel 23 on the VPN gateway. This SIU message is processed at the VPN gateway 2 by a daemon, for example, that is to say a background programme that provides services to the system.

In response to the SIU message the VPN gateway 2 updates its security association for the temporary inbound IPsec tunnel 23 to a new IPsec tunnel 26, having the new Care-of address of the mobile node 4 as destination address. This update is performed before any packet is sent to the mobile node 4, in particular the registration reply. In a preferred embodiment of the invention the SIU message from the home agent 5 to the VPN gateway 2 includes the registration reply to the mobile node 4.

It will appreciated that the particular routine of the home agent 1 is triggered only when the registration request is received through a VPN gateway such as 2, corresponding to a location of the mobile node 4 outside the private network 1. If the mobile node were situated within the private network 1, and therefore not using the VPN service, the home agent 5 would respond according to the normal routine with a normal registration reply.

At step 27, the VPN gateway 2 forwards the registration reply to the mobile node 4 using the newly-established inbound IPsec tunnel 26 and sends all further data packets to the new Care-of address using the tunnel 26 until further notice.

If a step 25 the registration request does not succeed at the home agent 5, the process is not irrmediably comprised. No registration reply will be received at the mobile node 4, which will send a further registration request. If the home agent 5 continues not to accept the registration request, the mobile node 4 will ultimately abandon the attempt and establish a new tunnel for a new Care-of address without taking advantage of the process of this embodiment of the invention. This situation is inherent in mobile IP scenarios.

Figure 4:
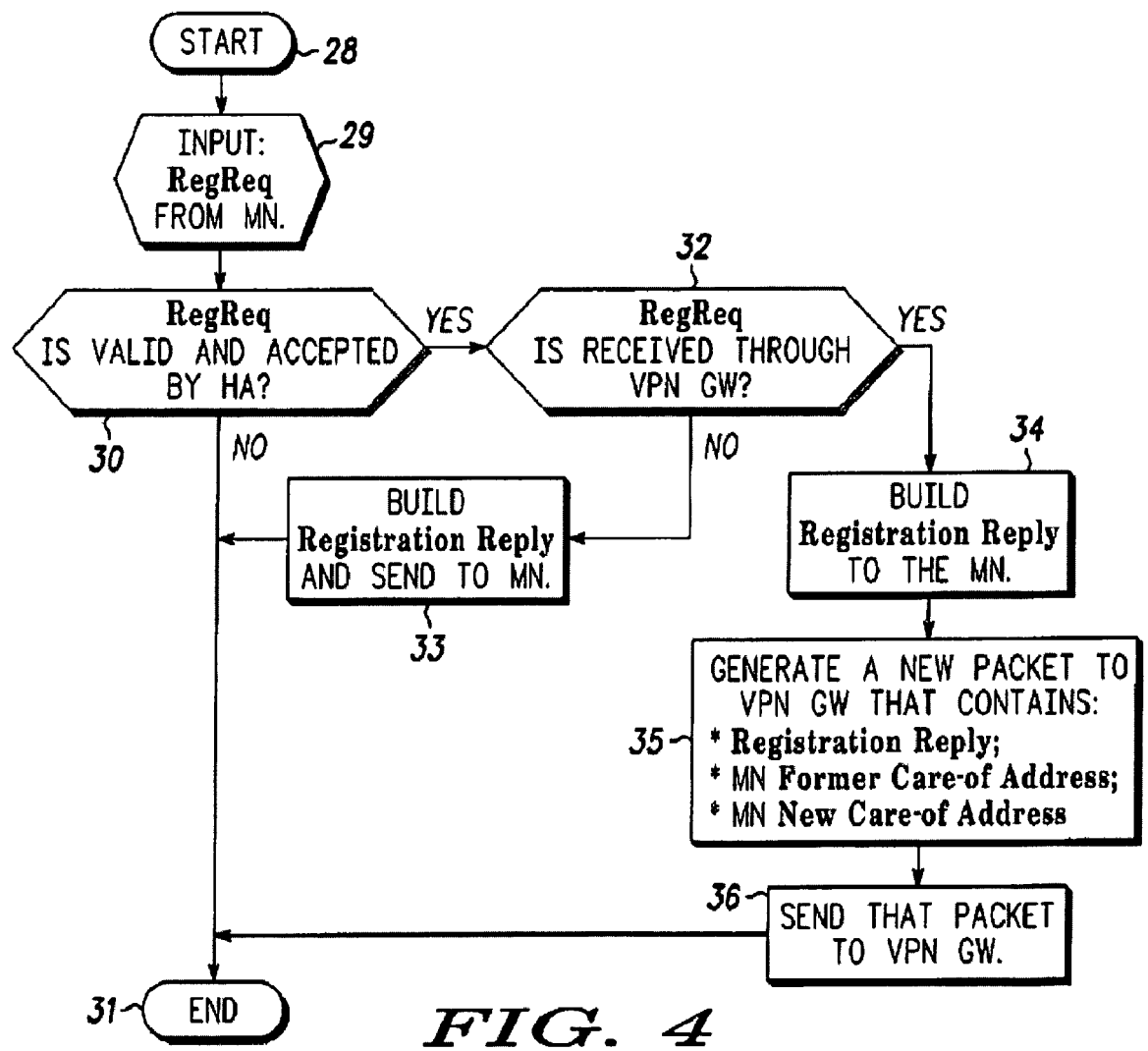
FIG. 4 is a flow chart of a process for reception of a registration request in the communication process illustrated in FIG. 3.

FIG. 4 illustrates the routines followed by the home agent 5 during the above process. The routine begins at 28 and at step 29 an Input is received in the form of a registration request from the mobile node 4. A check is made at step 30 whether the registration request is valid, and if the home agent 5 does not accept the registration, the routine terminates at 31. If the home agent 5 does accept the registration request, a check is made at 32 whether the registration request was received through a VPN gateway such as 2. If it was not, a registration reply is built and sent directly to the mobile node 4 over the private network 1 at step 33. If the registration request was received through a VPN gateway such as 2, a registration reply for the mobile node 4 is built at 34. This registration reply is then included in a new packet generated by the home agent 5 at 35 and which also contains the former Care-of address and the new Care-of address of the mobile node 4. That packet is then sent at step 36 to the VPN gateway 2 and the routine terminates again at 31.

The invention claimed is:

1. A method of mobile Internet Protocol communication between a private network and a roaming mobile terminal, said private network including a home agent for said roaming mobile terminal and a gateway through which said communication passes and which provides security protection for said private network, the mobile internet protocols of said communication including security association bundles each including a security association between said roaming mobile terminal and said gateway for inbound communication and another security association for outbound communication, the method comprising the steps of:

in response to a handover of communication, causing a care-of IP address (MN Co @) of said roaming mobile terminal to change to a new care-of IP address (MN New Co @), said roaming mobile terminal updates its inbound security association from said gateway so that it can receive packets sent to it with said new care-of IP address (MN New Co @) as destination, said roaming mobile terminal sends a first signalling message with said home agent as destination in a secure tunnel to said gateway, said first signalling message indicating said new care-of IP address (MN New Co @) in secure form to said home agent, the inbound security association of said gateway from said roaming mobile terminal accepts said first signalling message without checking its source address, said gateway forwards said first signalling message within said private network to said home agent, said home agent checks the validity of said first signalling message and, if it is valid, updates its address data and sends a second signalling message to said gateway indicating said new care-of IP address (MN New Co @), and said gateway updates its outbound security association with said roaming mobile terminal in response to the new care-of IP address (MN New Co @) indicated.

2. A method as claimed in claim 1, wherein communication between said roaming mobile node terminal and said gateway is in accordance with an IPsec protocol specification.

3. A method as claimed in claim 2, wherein communication between said gateway and said roaming mobile terminal is in accordance with an Encapsulating Security Payload protocol used in tunnel mode.

4. A method as claimed in claim 1, wherein a registration reply for said roaming mobile terminal is included in said second signalling message.

5. A system for mobile Internet Protocol communication between a private network and a roaming mobile terminal, said private network including a home agent for said roaming mobile terminal and a gateway through which said communication passes and which provides security protection for said private network, the protocols of said communication including security association bundles each including a security association between said roaming mobile terminal and said gateway for inbound communication and another security association for outbound communication, the system comprising:

the roaming mobile terminal, in response to a handover of communication, causes a care-of IP address (MN Co @) of said roaming mobile terminal to change to a new care-of IP address (MN New Co @), said roaming mobile terminal updates its inbound security association from said gateway so that it can receive packets sent to it with said new care-of IP address (MN New Co @) as destination, and said roaming mobile terminal sends a first signalling message with said home agent as destination in a secure tunnel to said gateway, said first signalling message indicating said new care-of IP address (MN New Co @) in secure form to said home agent, the gateway, with the inbound security association of said gateway from said roaming mobile terminal, accepts said first signalling message without checking its source address, and forwards said first signalling message within said private network to said home agent, the home agent checks the validity of said first signalling message and, if it is valid, updates its address data and sends a second signalling message to said gateway indicating said new care-of IP address (MN New Co @), and the gateway updates its outbound security association with said roaming mobile terminal in response to the new care-of IP address (MN New Co @) indicated.

6. A system as claimed in claim 5, wherein communication between said roaming mobile terminal and said gateway is in accordance with an IPsec protocol specification.

7. A system as claimed in claim 6, wherein communication between said gateway and said roaming mobile terminal is in accordance with an Encapsulating Security Payload protocol used in tunnel mode.

8. A system as claimed in claim 5, wherein a registration reply for said roaming mobile terminal is included in said second signalling message.

* * * * *